(12) United States Patent
Phadke

(10) Patent No.: US 12,288,178 B2
Phadke
(45) Date of Patent: Apr. 29, 2025

(54) SYSTEM AND METHOD FOR MODELLING AND MONITORING PROCESSES IN ORGANIZATIONS USING DIGITAL TWINS

(71) Applicant: Sameer Phadke, Maharashtra (IN)

(72) Inventor: Sameer Phadke, Maharashtra (IN)

( * ) Notice: Subject to any disclaimer, the term of this patent is extended or adjusted under 35 U.S.C. 154(b) by 342 days.

(21) Appl. No.: 17/617,758

(22) PCT Filed: Jun. 28, 2020

(86) PCT No.: PCT/IN2020/050559
§ 371 (c)(1),
(2) Date: Dec. 9, 2021

(87) PCT Pub. No.: WO2021/001845
PCT Pub. Date: Jan. 7, 2021

(65) Prior Publication Data
US 2022/0237532 A1    Jul. 28, 2022

(30) Foreign Application Priority Data
Jun. 29, 2019   (IN) .............................. 201921026057

(51) Int. Cl.
G06Q 10/00 (2023.01)
G06Q 10/0637 (2023.01)
G06Q 10/067 (2023.01)

(52) U.S. Cl.
CPC ....... *G06Q 10/067* (2013.01); *G06Q 10/0637* (2013.01)

(58) Field of Classification Search
CPC .......................... G06Q 10/067; G06Q 10/0637
See application file for complete search history.

(56) References Cited

U.S. PATENT DOCUMENTS

2012/0290573 A1* 11/2012 Kachkovsky .......... G06Q 50/00
707/736
2016/0247129 A1* 8/2016 Song ...................... G06Q 10/20

FOREIGN PATENT DOCUMENTS

EP          3699704 A1 *  8/2020    ....... G05B 19/41885

OTHER PUBLICATIONS

How Digital Twins for Metrology Enables Smart Manufacturing. Manufacturing Business Technology. Advantage Business Media. (May 30, 2018) (Year: 2018).*

* cited by examiner

*Primary Examiner* — Gabrielle A McCormick
(74) *Attorney, Agent, or Firm* — Rimon, P.C.

(57) ABSTRACT

The present invention discloses a system and method for modeling and monitoring processes in organizations using digital twins. The system has a model builder to create models, communicate with a first user device and create an integrated model of the process called digital twin definition. The digital twin includes a server component for executing the digital twin definition and the server component further communicates with multiple transaction systems and auxiliary systems. The digital twin has a client module that enables output on a second user device and deploys the digital twins to monitor the processes. The present invention discloses method for creating dynamic models and monitor said models using digital twin. The present invention also discloses a method for creating said PLAY.

6 Claims, 9 Drawing Sheets

SYSTEM AND METHOD FOR MODELLING AND MONITORING PROCESSES IN ORGANIZATIONS USING DIGITAL TWINS

CROSS-REFERENCE TO RELATED APPLICATIONS

This application is a national stage of International Application No. PCT/IN2020/050559, filed on Jun. 28, 2020, which claims the benefit of priority from IN 201921026057 filed on Jun. 29, 2019, the disclosures of each of which are hereby incorporated by reference in their entirety.

FIELD OF THE INVENTION

The present invention relates to modeling business processes, deploying these models to run as digital twins of the processes, and using these digital twins for monitoring the business processes and more particularly, the present invention relates to a plurality of such digital twin representing the digital twin a part of an organization or of the entire organization.

Definitions

As used in the present invention, the following terms are generally intended to have the meaning as set forth below, except to the extent that the context in which they are used indicate otherwise.

The expression 'Organization' used in the context of this invention refers to, but is not limited to, a business organization or government or institution or any organized group pursuing a specific purpose. Specifically in reference to current invention, the expression 'organization' refers to, but is not limited to, a parent collection of all systems including IT as well as non-IT systems, people operating these systems as well as supervising them in order to achieve specific actions and activities related to different processes and different 'entities' participating in these processes.

The expression 'Process Area' used in the context of this invention refers to, but is not limited to, collection of similar processes and transactions belonging to a common area of an enterprise. (Examples may include Sales, Marketing, HR, Accounting, Treasury, Legal etc.).

The expression 'Systems' used in the context of this invention refers to Physical or virtual platforms or platform components on which actions or transactions are performed. (Examples may include software systems like ERP, Email software, or platforms like Oracle database, storage systems, or hardware servers or even manufacturing machines and workstations).

The expression 'Entity' used in the context of this invention refers to, a system level object or transaction level object that has Specific characteristics, Identifiable lifecycle, and is considered to have significant impact on or to play a significant role in overall operation of the process area.

The term 'twin' in the industry relates to a combination of one or more models of an entity running independent of the actual entity.

The term 'digital twin' is a digital representation of a real-world entity or system. The implementation of a digital twin is an encapsulated software object or model that mirrors a unique physical object and or a software design pattern, organization, person or other abstraction.

The term 'holon' or 'holons' is referred to as something that may be present individually and/or is a part of something. The holons exist simultaneously as self-contained wholes in relation to their sub-ordinate parts, and as dependent parts when considered from the inverse direction.

The term 'holonic entity' refers to an object or abstraction of the aforementioned entity that has an independent existence and can be viewed as a holon as defined above. In the context of present invention, an entity or a business object can be termed as a holonic entity if it can have an existence or it can continue to fulfil its role even in absence of its holarchical parent or container entity, in the same way as in presence of the holarchical parent entity.

The term 'operational model' in context of the present invention refers to a digital model or representation of aforementioned holonic entity wherein the lifecycle of the entity is represented as a finite state machine, the activities performed during the lifecycle are represented as steps and operational aspects of entity lifecycle are captured through necessary logic.

The expression 'Play' used in the context of this invention refers to, but is not limited to, a complete representation of an entity and its contribution to the process area or enterprise. The expression 'Play' is a digital twin of an holonic entity. 'Play' comprises of at least one operational model and may include a combination of other operational or analytical models.

The term 'Tag' used in the context of this invention means a 'reference' contained within the model or play, pointing to a specific attribute of the system or process that is considered to be of significance in the model of the process. Out of a large number of properties or attributes, only a few are considered important for the play, and such attributes are considered to be 'tagged'.

These definitions are in addition to those expressed in the art.

BACKGROUND OF THE INVENTION

The Information Technology (IT) application landscape in many of the organizations across the world has attained a matured state in terms of capturing and storing all critical business transactions in various process areas like finance, sales, marketing, manufacturing, projects and product management, supply chain management and the like. A large number of integrated or stand-alone IT systems provide functionality fulfilling these needs. Some examples are ERP systems, Customer Relationship Management (CRM) Systems, Supply Chain Management (SCM) Systems, Manufacturing Information Systems, various financial accounting software and the like. Together, such systems have been termed as 'systems of record' or transaction processing systems in the prior art.

During past two decades, a lot of attention has been paid to the area of "Business Process Management" (BPM). BPM focuses on 'processes' rather than transactions with a view to capture, analyze, optimize and automate them. In the prior art a number of BPM Suites exist that provide features to manage and execute business processes. Existing BPM solutions typically include workflow and modeling services. Such BPM solutions also execute the underlying process steps or transactions. Most of the BPM suites use the BPMN notation for modeling in the prior art. Existing suites that are known in the art are either human centric (workflow) or integration centric (service bus) or document centric (case tools), or a combination of these.

The digital transformation, powered by technologies like artificial intelligence and automation have been in focus as a lever for improvement of business performance. In case of automation, in addition to earlier methods, number of new RPA (robotic process automation) tools have been invented in the art. Artificial Intelligence tools and algorithms have been successfully applied to a number of specific problem statements. Broad application of these tools to all business processes is still in process of maturing.

Digital Twins, as a phenomenon, as well as implementations of digital twin as technology have been in existence for quite some time. With advent of computing technology and with its increasing accessibility and affordability, complex digital twins are becoming viable for a large number of applications. A digital twin is defined as a digital representation of a real-world entity or system. The implementation of a digital twin is an encapsulated software object or model that minors a unique physical object, process, organization, person or other abstraction. Thus a twin can be seen as a set of one or more models of an entity, executing independently of the original system, but within a shared context.

A number of existing applications of digital twins have been disclosed in the prior art. Each application of digital twins is characterized by the application or purpose of the digital twin and composition of models used in the digital twin. These two aspects are distinct but closely related. For example, a number of existing embodiments of twins model manufacturing plants, machines or workstations. Some of these twins are used for process simulation or scenario analysis, while some others are used for shopfloor design purposes. Some embodiments have digital twins of airplanes used for simulation and personnel training. Models utilized in these twins are as appropriate for the purpose.

US Patent Application No. US20190138970A1 cites use of digital twins based on 'physics based models' being used in context of Operations Technologies like control systems, data historians, alarm systems and the like. Further, the this patent proposes combining Operations Technologies and IT into a twin. This patent application suggests storing of information that is captured about the "entity" as the "context" and runs the action with reference to that "context". It is noted that this patent application discloses terms such as 'Twin builder', 'twin runtime', 'graph database', 'Kafka pipeline' and 'knowledge ingestion'. The U.S. patent application '970 mainly focuses on digital twins of physical systems and lacks the focus on developing digital twins for processes in an enterprise. This patent disclosure aims to display the processed data and recommended actions on User Interface although that doesn't detail any mechanism of intervention into the real time functioning of the physical entity. The U.S. Patent Application US20190138970A1 mentions possibility of aggregation of entities but does not disclose a method to aggregate to the enterprise levels.

Another patent application WO2018140395A1 discloses a method for creating a digital twin for an entire industrial facility. This disclosure proposes creation of digital twins for individual 'assets' like machines, workstations etc. and developing digital twins based on operational technology models. The focus of this disclosure is mainly on physical objects mostly industrial objects. This disclosure does not attempt to model 'processes' as the base unit for digital twins. This patent application discusses the use of various operational models and combines these various models for forming a digital twin. It is noted, however that the patent application WO2018140395A1 discloses the forming of digital twins of physical systems only and it does not disclose the digital twins relating to software systems.

Yet another U.S. Pat. No. 10,431,005B2 discloses the use of digital twins in the field of augmented reality, for real-time generation of image. The digital twins proposed in this patent application uses models to create visual simulations of behaviour of a physical system. However, this patent application does not disclose the use of digital twins for monitoring and performance improvement of the object or systems. This patent application does not propose creating digital twins for processes.

Yet another US Patent Application US20170286572A1 proposes creation of digital twin classes of specific classes of physical apparatus such as compressors, turbines and other such high energy assets. It proposes digital twins based on physics based models or operations technology based models. It is noted that this disclosure does not include creating digital twins of processes. Also, this disclosure does not propose any intervention or actuation by the digital twin.

The present field of invention ie. the art of modelling of processes in business and creating digital twins of the processes, presents some unique challenges.

Some processes in an organization transcend more than one systems of record. This means some transactions of that process may be processed in one system while others may be processed and stored in another system. In most cases, transaction data flows seamlessly between applications. Thus application integration exists. However, end-to-end process monitoring is not possible in most of the cases. Thus, in spite of application integration, many of these develop into technology silos.

It is seen that in many cases, separate applications have their own master data which may not always be in sync. Different reports/dashboards may give mismatched views.

Each enterprise is unique in many ways. Even parts of same enterprise are different in many ways. Processes have business specific or product specific or location specific nuances. Sometimes, these nuances bring in significant advantages. The systems of records in the art are focused towards standardization in transaction execution. Therefore, these important customizations are discouraged or left out of scope of transaction systems. These are then managed on some platform which is not integrated.

A process comprises activities which are transactional as well as non-transactional. Typically, systems of record capture only transactional activities. Many important, non-transactional aspects like budgets, forecasts, targets etc. are often managed in auxillary platforms like spreadsheets. Such disconnected process actions and/or disconnected execution artifacts are typical manifestations of technological or organizational silos.

Technology silos or organizational silos as described above result in challenges in obtaining an integrated, end to end process view and ability to monitor the effectiveness of processes.

Complexities inherent in transactions and storage of transaction data, combined with significant portions of process being left out of the systems, tend to entangle process views, and obscure data visibility. These also result in significant difficulties in implementation of automation and AI technologies, since a lot of effort is spent in gathering, validating and conditioning data due to the above exclusions. Inclusion of decisions emanating from digital technologies, AI etc into existing process flows often entail significant effort or customization of transaction system implementations. Significant number of failures have been reported in implementations of technologies lice AI, ML etc. due to challenges in integration with existing system landscape. All of the above challenges are due to lack of 'convergence' within the application landscapes and process areas.

There is a need of a system and method for creating dynamic models of processes that can transcend organizational or technological silos, capture both transactional and non-transactional parts of processes, easily incorporate all process customizations without disrupting transactions, and be rid of transactional complexities not relevant from process point of view. There is also a need of a system and method of creating live digital twins, that can provide end-to end process views, help disentangle process flows and democratize visibility of process execution information. Further, there is a need to provide an independent platform, running in tandem with all transaction systems, that can facilitate easy convergence of new non transactional technologies into current operations landscape. Further, there is a need a system and method that can create, deploy and run models and to monitor the processes real time.

SUMMARY OF THE INVENTION

A system for modeling processes in organization, deploying such models as digital twins and monitoring the processes using these digital twins has a first user device; the first user device is configured to receive data from the user. The system has a model builder for creating models that communicates with the first user device and based on inputs received from the first user device. Creates an integrated model of the process which is called digital twin definition and stores the digital twin definition on a storage unit The digital twin runs the models in digital twin definition. It has a server component executing the digital twin definition. The server component communicates with multiple transaction systems and auxiliary systems. The server component also interprets models and executes a PLAY. The digital twin has a client module that enables output on a second user device. The digital twin definition includes organizational information related to masters, IT and non-IT systems, organizational structures, roles and responsibilities and employee information, which provides the execution context for all models in the digital twin.

The digital twin definition includes at least one operational model and a plurality of other models of the entity being modeled, representing transactional and non-transactional aspects of the process. The operational model includes definition of entity lifecycle, process performance parameters, visibility requirements and actuation requirements. The digital twin communicates with a plurality of transaction systems and auxiliary systems in a bidirectional manner, the data exchange includes reading the data related to transactional and organizational information and writing data through systematic mechanisms to initiate or actuate specific predefined interventions.

The model builder has a model creator that is configured to allow a user to define finite state machine for the entity lifecycle, define steps within each state of the state machine, associate systems with said steps and define transition conditions between states. The model builder has a logic builder that is configured to allow user to create executable logic that executes on the server component of the system, interpreting state and dynamics of the process from input data received from the transaction systems. The logic builder prescriptively defines requirements for model logic based on inputs to the model creator. The model builder has a data fetching configuration module that is configured to prompt the user, comprehensive data requirements based on lifecycle model and tag list and to allow the user to configure individual data exchanges with various systems. The data fetching configuration module prescriptively generates interface requirements based on inputs to model creator. The model builder has a result configuration module that is configured to enable said user to configure at least one widget for displaying client side visualizations.

The organization definition module enables the user to capture essential information of an organization and its process areas. The model builder has a model manager configured to allow said users to add additional models to the play and configure said models to work with the base operations model.

The compiler and output formatter is configured to validate the received user inputs obtained from the model creator, the logic builder, the data fetching configuration module, the result configuration module and the model manager, the output complier being configured to further interpret the inputs, validate such inputs for correctness in relation with organization information and create the digital twin definition and store the digital twin definition on the first data storage.

The digital twin includes the server component having a model interpretation module configured to read transaction data and other relevant data from the transaction buffer that is fetched and stored in the transaction data buffer by the data configuration module as per the configuration specified in the digital twin definition, evaluate the model based on the received data and send evaluation outcomes to the storage in the client handler module. The said server component also contains two independent scheduling modules to specify several schedules for data fetching and model evaluation frequencies.

The digital twin has a client handler configured to process said data from said second data storage to generate response output on receiving a request by a request controller, and further configured to interface with said result generator to format and transmit said result.

The analytics module is configured to analyze analytical models within the play.

The method for modeling processes in organization, deploying these models as digital twins and monitoring the processes using these digital twins using system, comprises steps for: selecting process areas for creation of model; identifying and listing objects and entities participating in the process area; identifying holonic entities from the list and merging all non-holonic entities as properties of one or more holonic entities; qualifying holonic entities, based on attributes of the holonic entities; merging non-qualified entities within one or more qualified holonic entities as properties, the aforementioned process steps allowing user to flexibly define boundaries of plays and link them with holarchical relationships; prioritizing and ordering the qualified entities for actual creation of Plays; creating a play, facilitating at least one model builder for each qualified holonic entity; establishing data interfaces with transaction data fetching module and existing transaction systems; executing the digital twin definition on the server in supervisory mode, in parallel with the actual transactions as a digital twin, wherein the twin works as an observer, evaluating the model on real time inputs, actuating actions on transaction systems and monitoring business process using predefined performance measures and alert conditions.

The method for creating Play includes steps of identifying lifecycle states for holonic entity, the model creator creating a finite state machine for the entity; identifying transitions from each state and identifying enabling transition condition; identifying process steps involved within each state, and actions associated with said process steps, the aforementioned process steps allowing business view of the process being mapped to the technology and systems over the entity lifecycle; identifying and tagging perimeters from the transaction system to be included in the model; using the logic builder to define and program various model conditions for transitions, step completions and other conditions, making the model logic free of transaction complexities; model creator recording parameters like performance parameters, invention parameters; the data fetching configuration module defining data interfaces with the transaction Systems, requirements of interfaces being prescriptively generated based on system definitions; the result configuration module programming result visualization; organization module configuring masters, roles, systems, organization structure, employee information and employee roles; model manager creating and integrating models to run in tandem with base operational model; and the output compiler compiling testing and deploying Play components on respective server components.

BRIEF DESCRIPTION OF ACCOMPANYING DRAWINGS

The objectives and advantages of the present invention will become apparent from the following description read in accordance with the accompanying drawings wherein.

Figure 8:
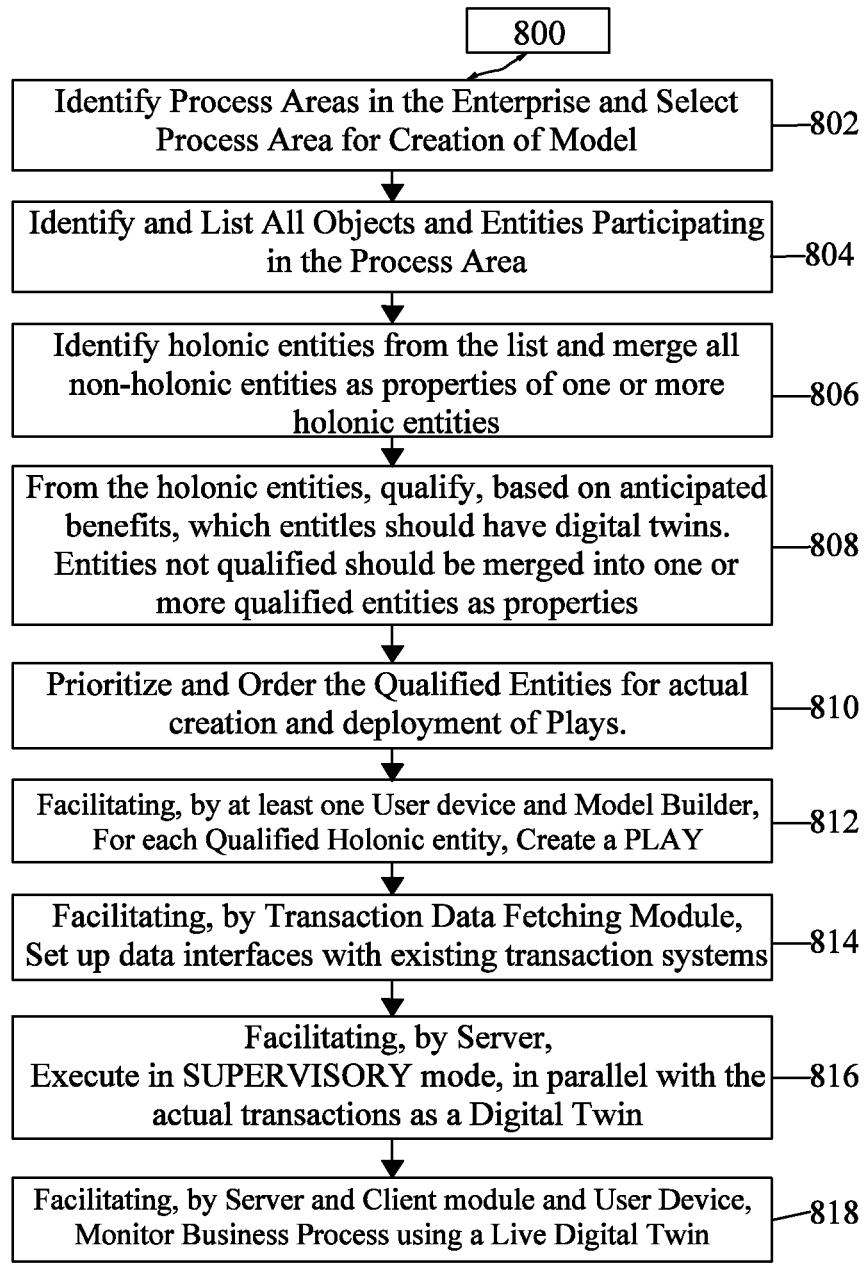
FIG. 8 shows steps involved in a method of the present invention to create dynamic models of a process, and monitoring the process using its digital twin, using the system of FIG. 2.

It is in continuation of FIG. 8 and details the main step 'Create the PLAY', in accordance with the present invention.

NUMERICAL LABELS

100—System And Method For Modelling Processes in Organization and Monitoring Processessing Digital Twin
104—Transaction Systems
108—Auxiliary Systems
112—Model Builder
114—Digital Twins
120—Client
124—Processor
126—Memory Chip
202—Integrated Process Model (output of the Model builder), Definition Of Digital Twin
204—Storage
206—User Device 1
208—User Devices 2
210—Server Component
212—Client Module
300—Organization
302—Process Areas
304—Systems
306—Masters
308—Org Structures
310—Master Roles
312—Org Employees
314—Process Area
402a—Holonic Entity 1
404a—Play 1
402b—Holonic Entity 2
404b—Play 2
402n—Holonic Entity N
404n—Play N
502—Play
504—Base Operations Model
506—Entity Lifecycle
508—Performance
510—Visibility
512—Interventions And Actuations
514—States
516—Steps
518—Transitions
520—Actions
522—KPI
524—Alerts
526—Roles
528—Views
530—Individuals
532—Dashboards
534—Automation
536—Action Calls
538—Tag List
540—Other Models
542—Basic Statistical Models
544—Decision Systems Models
546—AI And Machine Learning Models
548—Lifecycle Models
550—Budgets, Plans, Forecasts
552—Gamification Models
554—Or Based Models
556—Mathematical Models
602—Model Creator
604—Logic Builder
606—Transaction Data Fetching Configuration Module
608—Result Configuration Module
610—Organization Context
612—Model Manager
614—Compiler And Output Formatter
700—Model And Transaction Data Interpretation Module
702—Transaction Data Fetching Scheduler
704—Transaction Data Fetching Module
706—Transaction Data Buffer
708—Model Evaluation Scheduler
710—Transaction Data Processing Module
712—Actuation Module
714—Client Handler
716—Data Storage
718—Request Controller
720—Result Generator
722—Analytics Module
724—Statistical Engine
726—Learning Engine
728—Collaboration Server Module
730—Process Viewer
732—Result Formatter 734—Client Side Analytics
740—Collaboration Client

DETAILED DESCRIPTION OF THE DRAWINGS

The invention described herein is explained using specific exemplary details for better understanding. However, the invention disclosed can be worked on by a person skilled in the art without the use of these specific details.

References in the specification to "one embodiment" or "an embodiment" means that particular feature, structure, characteristic, or function described in connection with the embodiment is included in at least one embodiment of the invention. The appearances of the phrase "in one embodiment" in various places in the specification are not necessarily all referring to the same embodiment.

References in the specification to "preferred embodiment" means that a particular feature, structure, characteristic, or function described in detail thereby omitting known constructions and functions for clear description of the present invention.

The foregoing description of specific embodiments of the present invention has been presented for purposes of illustration and description. They are not intended to be exhaustive or to limit the present invention to the precise forms disclosed, and obviously many modifications and variations are possible in light of the above teaching.

In all descriptions, all distinct environments in the present embodiment that are part of the a 'system and method for modeling processes in organization and monitoring processes using digital twin' are hereinafter referred to as "system" or "system and method" of the present invention.

Figure 1:
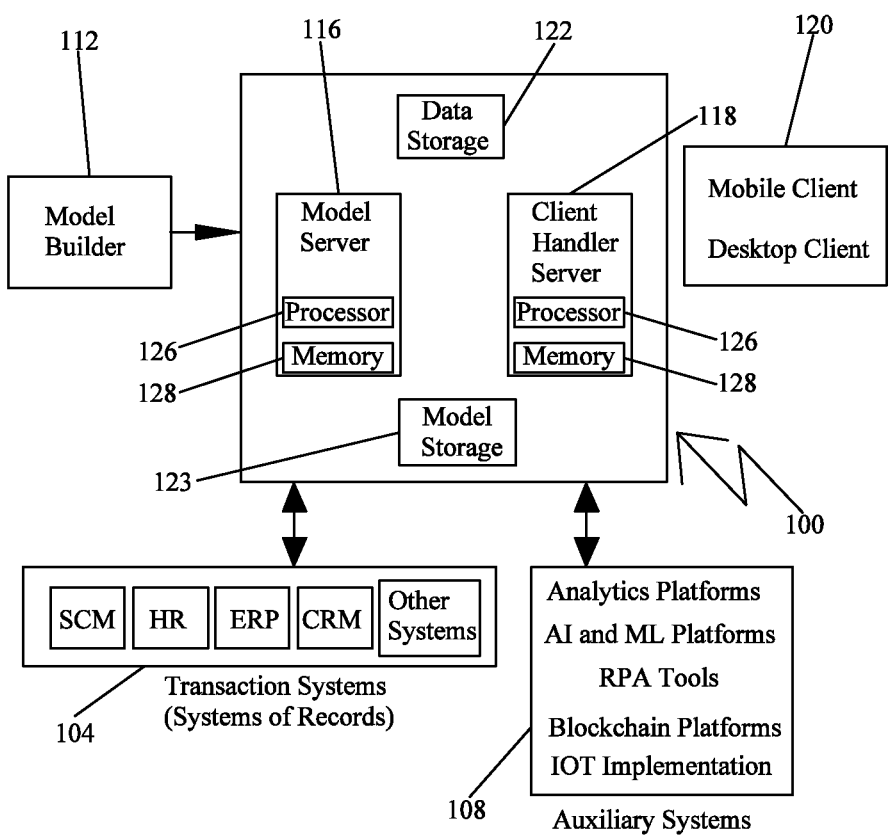
FIG. 1 shows system for modeling processes in organization and monitoring the processes using digital twin communicating with other systems in the system environment.

FIG. 1, shows a system of the present invention 100 as well as environments with which the system interacts. In accordance with the present invention, the system 100 includes a model builder 112, a digital twin 114 and an end client module 212. The model builder 112 is hosted on either a desktop or a virtual environment. The digital twin 114 includes a plurality of server environments which are typically hosted either in cloud or in client premises. In accordance with the present invention, end clients views the output or monitors the process through digital twins from an end user device such as a laptop, a desktop, a smart phone, an iPad, and a tablet.

In accordance with the present invention, the digital twin 114, which is part of the system 100, communicates with a plurality of transaction systems 104 and auxillary systems 108. The transaction systems 104 generally include systems such as Human Resource System, Supply Chain Management System, Enterprise Resource Planning System, or other systems of record. Auxiliary systems 108 generally include various platforms such as Artificial Intelligence Platforms, Analytics Platforms, IOT platforms as well as common operational tools like spreadsheets etc.

It is understood, that a process includes multiple underlying transactions as well as non-transactional activities. The transaction systems 104 that are also referred as 'systems of record' capture transaction details. A process also includes important non-transaction activities like analysis, forecasting, predictive insights, budgets etc. Multiple systems that enable these activities such as spreadsheets, AI systems, RPA tools etc. that are not systems of record are termed as auxiliary systems 108 in accordance with the present invention.

The digital twin 114 runs on a processor 124 and memory chip 126 that is configured to receive and execute the functions as per the present invention. In the present embodiment, the processor 124 is selected from the group including of an application-specific integrated circuit (ASIC), a field-programmable gate array (FPGA), an advanced RISC machine (ARM) processor, a microprocessor or a controller, and any combination thereof.

The system 100, and specifically the digital twin 114 interacts in a bidirectional way with the transaction systems 104 and auxiliary systems 108. In accordance with the present invention, the digital twin 114 reads from transaction systems 104, specific entity attributes as well as organization attributes like master data, employee data etc. From auxiliary systems 108, the digital twin 114 reads auxiliary parameters such as targets, budgets, forecasts, analytical results etc. The digital twin 114 is configured to send pre-defined actuation commands to transaction systems 104 and auxiliary systems 108. These actuation commands invoke, for example, a service or execute a command or activate a bot etc. The actuation commands are invoked along with necessary data or parameters as needed by the service or the bot.

Figure 2:
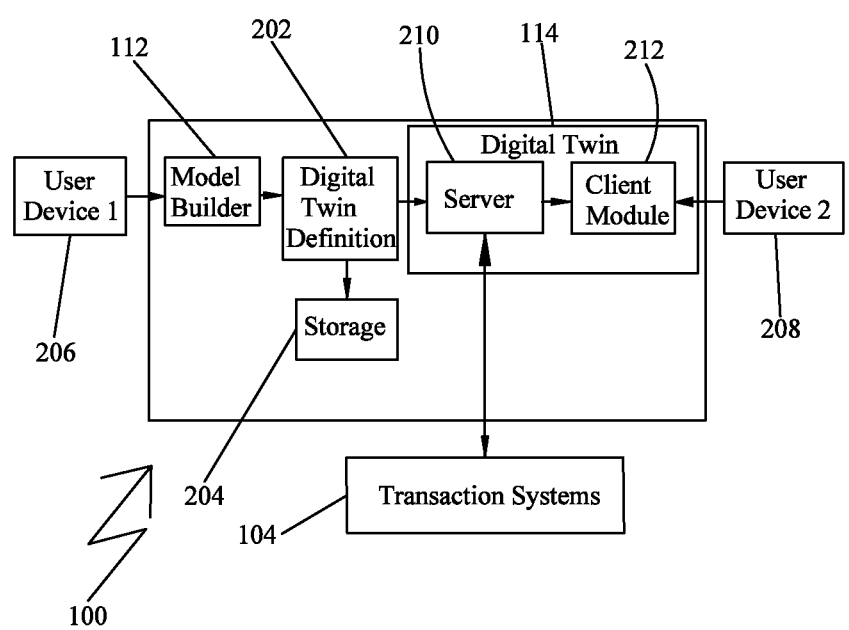
FIG. 2 shows the system of FIG. 1 of the present invention including a plurality of modules in accordance with the present invention.

FIG. 2 describes the system 100 in accordance with the present invention. The system 100 includes the model builder 112, the digital twin 114, at least one first user device 206 and at least one second user device 208. The first user device 206 is configured to receive user inputs. In this embodiment, the model builder 112 receives inputs required to create a play 502. The inputs include entity lifecycle 506 definition, performance specifications 508, visibility requirements, 510 and intervention requirement 512. The model builder 112 also receives organization configuration and specifications of other models. In this embodiment, the first user device 206 is selected from the group consisting of, but is not limited to, a laptop, a desktop, a smart phone, an iPad, and a tablet.

The model builder 112 is configured to communicate with the first user device 206 to receive inputs needed to create various models of a process and is further configured to compile and format all these input into a complete definition of a play 202 hereinafter referred to as 'digital twin definition' stored on a first data storage 204. The digital twin definition 202, is deployed on the server 210 of the system 100, the live interfaces are set up with necessary transaction systems 104 and its output is to be viewed on the second user device 208. The digital twin 114 comprises a server component 210 and a client module 212.

Figure 3:
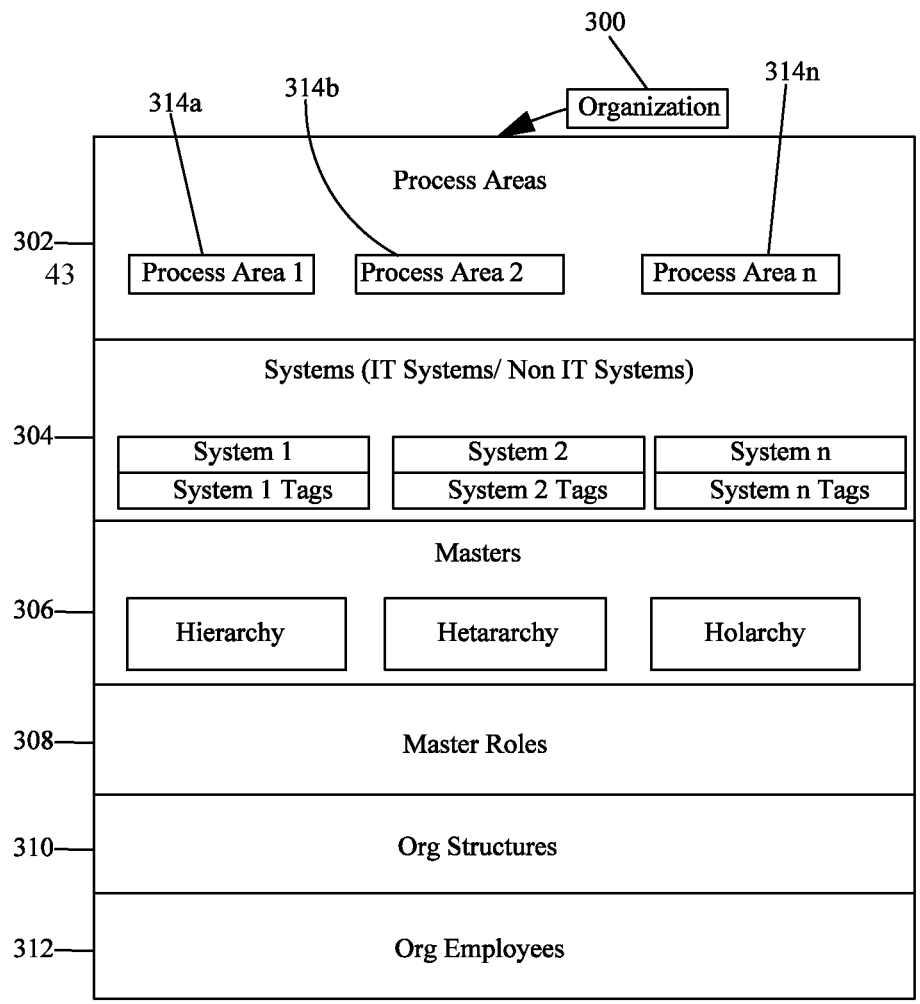
FIG. 3 shows a logical representation of an organization as modeled in accordance with the present invention.

FIG. 3 shows logical components of an organization 300 as proposed in the current invention. The organization 300 provides the context in which various IT or non-IT systems operate. Multiple operations or transactions result in realizations various processes. Organization 300 is considered to include all process areas 302 and all IT and non-IT systems 304. In accordance with the present invention, the organization 300 also provides a context to all plays to operate. This context includes, but is not limited to master data 306, definitions of roles and responsibilities 310, information pertaining to organizational structures 308 and employee data 312. In present invention, master data 306 also includes relationship information, which may be one of the type hierarchies, heterarchies or holarchies. In accordance with the present invention, an organization 300 includes at least one process area 302 and at least one system 304.

Figure 4:
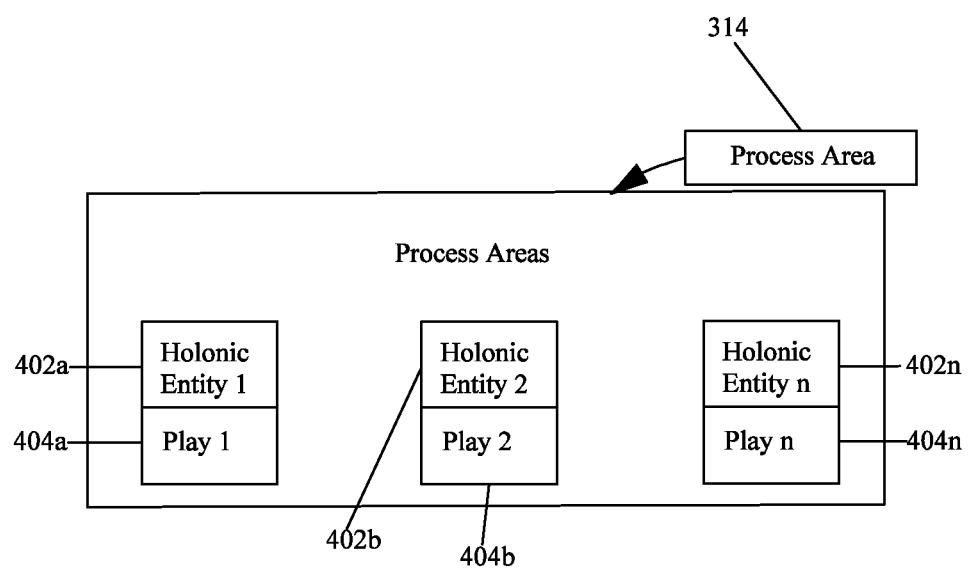
FIG. 4 shows logical components of a process area that is part of the organization of FIG. 3.

FIG. 4 shows logical components of a single process area 314 within an organization described in FIG. 3. In the present embodiment, each process area 314 includes at least one holonic entity 402a that has been qualified to be modeled as a primary entity of a play 502. The play 502 created with entity 402a as primary entity is 404a. In the present embodiment, the model of the process area 314 is a combination of all the plays corresponding to the qualified holonic entities such as 402*a*, 402 *b* etc.

In accordance with the present invention, entities in an organization include business entities and system entities. The business entities are business objects or transaction artifacts being created in any process. The System Entities are configuration items such as IT systems or physical systems.

While the twin 114 is being executed in the system 100 of the present invention, at any point, multiple instances of a business entity are in existence, each following its independent life cycle. In case of system entities, only one instance of every system entity exists at a time.

In accordance with the present invention, a holonic entity is defined as an entity that has an existence or that continues to fulfill its role even in absence of its holarchical parent or container entity, in the same way as in presence of the holarchical parent. For example, a hard disk doesn't fulfill the role in absence of a computer, which is the holarchical parent of a hard disk. Hence, the hard disk cannot be a holonic entity, however, the hard disk is component of another entity. On the other hand, a cloud storage unit may be modeled as a holonic entity as that still continue to fulfill the role assigned to the cloud storage, even in absence of the holarchical parent of the cloud storage: a storage cluster. In an another example, a line item in an order is not or may not be a holonic entity; however, a delivery note based on that line item, or an invoice based on that line item is modeled as a holonic entity.

Figure 5:
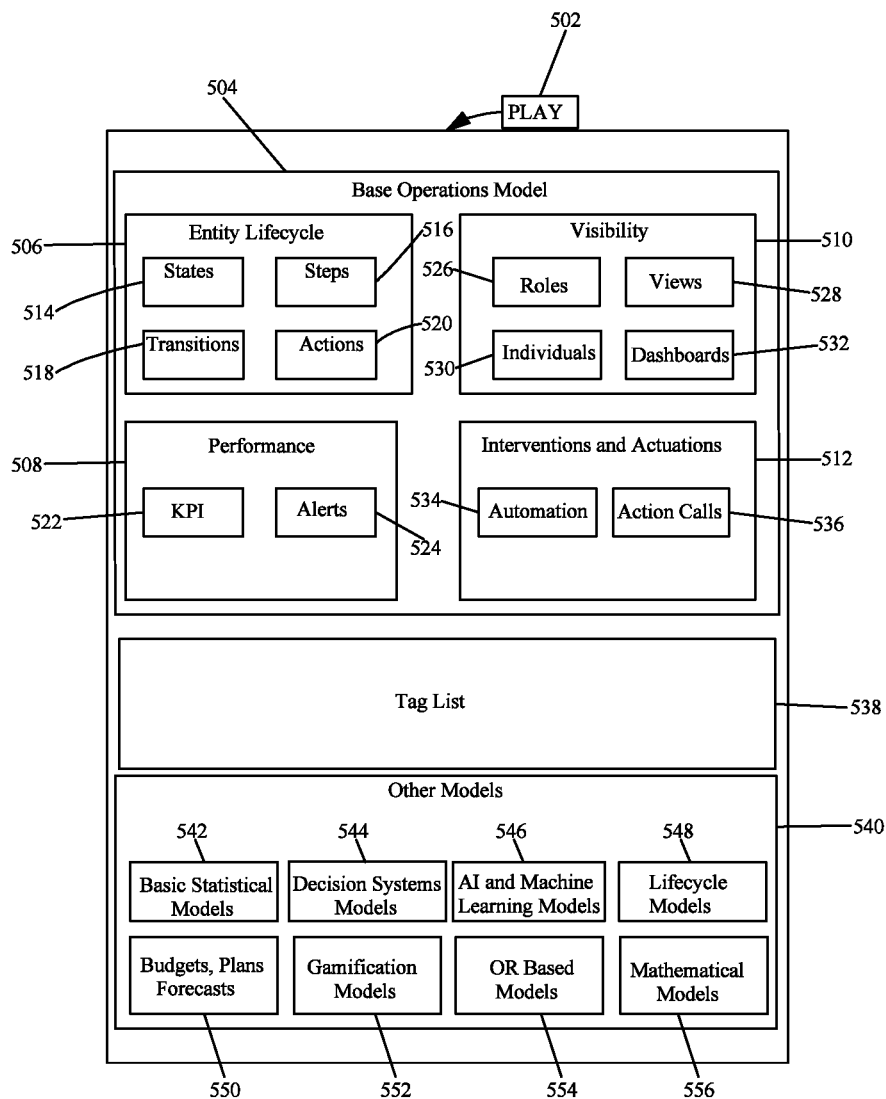
FIG. 5 shows various components of a PLAY that are deployed on digital twin of FIG. 1.

FIG. 5 shows components of the PLAY 502, including the digital twin 114 as shown in FIG. 1. The PLAY 502 includes of a base operational model 504 (hereinafter referred to as "base model"), an optional collection of other models 540 configured to work in tandem with the base model 504 and a shared tag list 538.

The base operational model 504 is the central component of a digital twin 114 of the process being modeled in accordance with the present invention. The base operational model 504 captures the lifecycle and allied operational parameters as captured in numerous underlying transactions that make up the process. This definition of the base operational model 504 ensures that the digital twin mirrors the behavior of the actual process. The base operational model 504 includes entity lifecycle model 506, performance parameters of the process 508, visibility requirements of the process 510 and interventions and actuations definitions 512.

The entity lifecycle model 506 includes definitions of states 514, definitions of steps or activities executed in each step 516, necessary logical conditions signifying transition conditions 518, and manual or automated actions that are part of the steps 516. This aspect of the twin 114 ensures business oriented interpretation of underlying transactions. In the present embodiment, the entity lifecycle model 506 is realized by a unique combination that includes creation of finite state machine for the process and identification of activities being carried out within each state of the finite state machine. This combination uniquely captures both composition as well as dynamics of the process.

Performance parameters 508 include two important aspects. First is definitions of Key Performance Indices (hereinafter referred to as KPI) 522 that the process is expected to achieve from business results point of view and the second aspect is the definitions of exceptional or alert conditions 524. This explicit and ingrained capture of performance parameters enables the twins in present invention to effectively monitor process performance.

Process visibility 510 definition includes specific requirements related to various roles 526 active in the process, views of the process 528, individuals 530 associated with the process and various dashboards 532 required for effective visualization of process status. This definition of process visibility democratizes information availability across silos.

The tag list 538 is a comprehensive list of all tags defined within the play, across all models. This concept of a shared tag list 538 across various models in the play enables the smooth convergence between various models including operational model, analytical models etc. The other Models 540 are additional models that typically represent non-transactional aspects of the process. Coherent synthesis of these aspects into the play enables real convergence. In the present invention, such models may include, but are not limited to statistical models 542, decision system models 544, AI and ML models 546, lifecycle models 548 and the like. This integration of a plurality of interrelated models into a single play provides significant advantages to the system 100.

Figure 6:
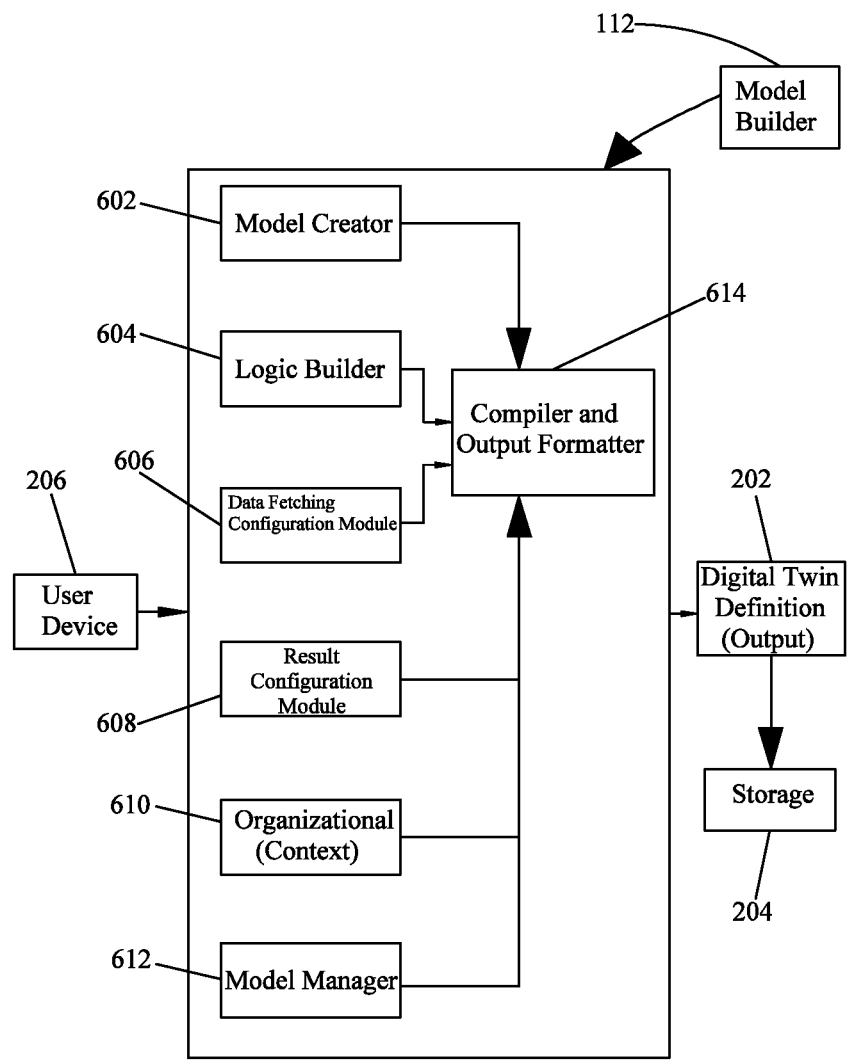
FIG. 6 shows model builder of FIG. 2 showing various components of the model builder.

Now referring to FIG. 6, the model builder 112 includes a model creator 602, a logic builder module 604, a data fetching configuration module 606, a result configuration module 608, an organization definition module 610, a model manager 612, and a compiler and output formatter 614. The first user device 206 enables users to input all the characteristics of the process as well as organization needed to create the play in to the model builder 112.

Output of the model builder 112 is the digital twin definition 202. In an embodiment, it is in form of a file. The model builder 112 compiles and validates various inputs and creates the digital twin definition 202 and persists it on the storage 204. The digital twin definition 202 must include all configurations of the play 502 along with contextual information of aforementioned organization 300 and process areas 314. The model builder 112 comprises specific functions to accomplish this goal.

The model creator 602 allows user to configure entity lifecycle 506, states, steps, transition conditions. It defines configurations related to process performance 508, and actuations 512. In the present embodiment, this module creates a Markovian State Machine of the underlying process, through capture of states and transition information. In another embodiment, the steps are captured using the standard 'Business Process Modeling Notation or 'BPMN'.

The logic builder module 604 allows user to specify logic required to be executed in order to interpret the state of the process from transaction data received from the transaction systems. In an embodiment, the logic builder module 604 enables 'No Code' graphical programming using various standards specified by IEC 61131 and IEC 61499. In yet another embodiment, the logic builder 604 enables a scripting interface and code to be generated using various parameters like tags.

The data fetching configuration module 606 captures comprehensive data exchange requirements with various systems participating in the Play 502. These include but are not limited to the underlying transaction systems 104. In an embodiment, this module is implemented as queues and topics configured in a platform like Kafka. The results configuration module 608 helps user configure client side visualizations for a play, as required by visibility requirements 510 for the play 502, by defining at least one widget.

The organization definition module 610 allows user to capture required information related to the organization 300 and process area 314. This information provides the context for the digital twin 114 to execute. The model manager 612 allows user to add all other models to the play and configure these models to work with the base operations model as specified by the model creator 602 through the result configuration module 608.

The compiler and output formatter 614 configured to validate the received user inputs and inputs obtained from the model creator 602, logic builder 604, transaction data fetching configuration module 606 and result configuration module 608. It is also configured to validate configurations of other models as specified by the model manager 612. It is further configured to interpret the inputs, compile them and create the output as the integrated process model 202. This integrated process model 202 is stored on the first data storage 204.

Figure 7:
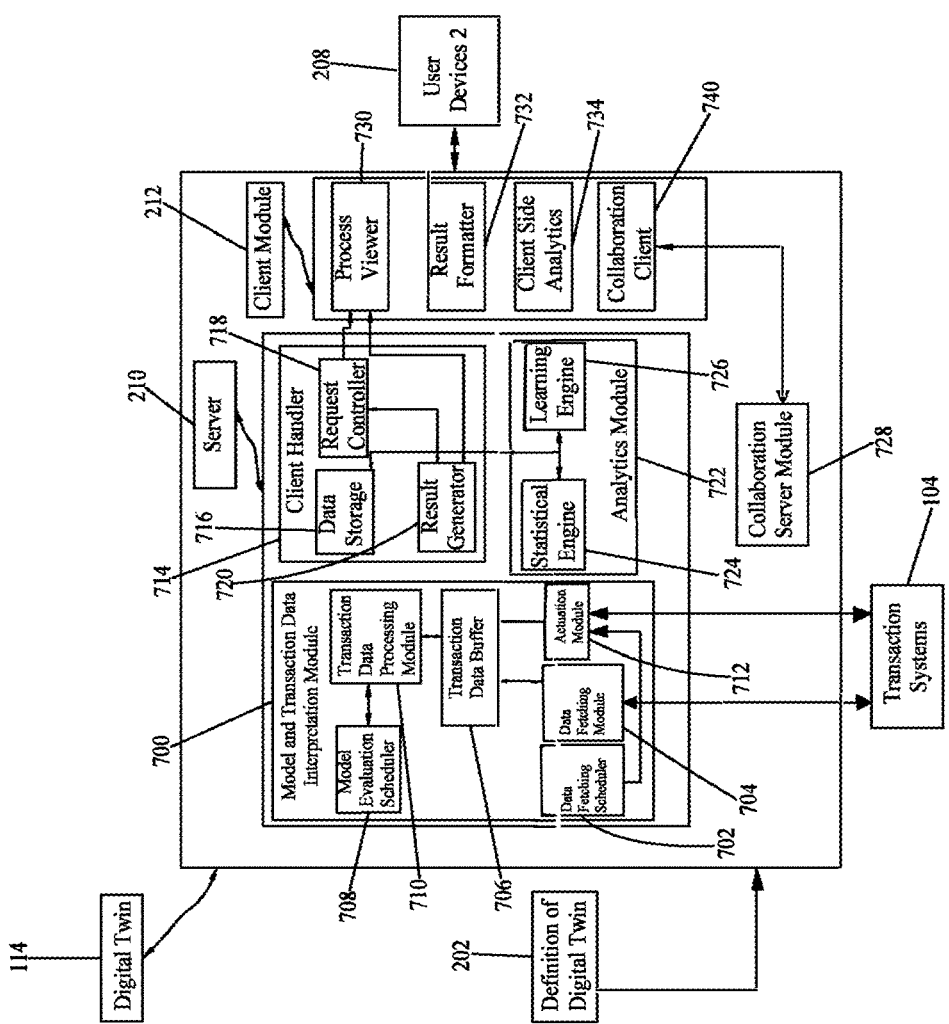
FIG. 7 shows a digital twin module of FIG. 2.

FIG. 7 describes the digital twin 114 component of the system 100. In accordance with the present invention, a play, or group of models deployed and executed in parallel with transaction systems are defined as the digital twin. The digital twin includes a server component 210 and a client component 212. The server component 210 includes model interpretation module 700, an analytics module 722, a client handler module 714 and a collaboration server 728. The server 210 receives the digital twin definition 202 and deploys and executes that digital twin definition 202.

In accordance with the present invention, the server execution broadly includes at least four operations. Firstly, the server 210 continuously interfaces with and fetches data from transaction systems 104 or auxiliary systems 108. Secondly, the server 210 interprets the data in terms of defined models and updates and manages the state. Thirdly, the server 210 receives and fulfils various client side requests. Lastly, the server 210 also manages collaboration between various users and user groups.

The model interpretation module 700 is configured to manage two sets of schedules. The data fetching schedules 702 manage communications with transaction systems whereas the model evaluation schedules 708 are set up as per time scale criticality considerations of the models and operations of the digital twins. The transaction data buffer 706 holds transaction and master data received from transaction systems and actuation data to be sent to individual systems. In the present invention, these buffers are implemented through messaging platforms like kafka. Transaction data processing module 710 reads data from the buffers 706, evaluates the model and sends evaluation outcomes to the client handler module 714. The analytical models configured within the play are evaluated by the analytics module 722 as per the signal from scheduler 708.

The client handler module 714 includes a data storage 716, a request, controller 718, and a result generator 720. In an embodiment, data storage 716 includes a graph database in combination with a distributed data store handling structured and unstructured data.

The collaboration server module 728 enables various users of system 100 to collaborate and communicate with help of collaboration client 740. The system 100 provides a unique and advantageous feature where users collaborate and communicate on specific topics in the model such as business entity, a system entity, an alert, an action, a KPI etc.

The client module 212 includes a process viewer 730, a result formatter 732 and a client-side analytics module 734 and a collaboration client 740. The client module runs on a second user device 208 and fulfills key monitoring requirements of views 528, dashboards 532 and alerts 524. In accordance with the present invention, the second user device 208 is selected from the group consisting of, but is not limited to, a laptop, a desktop, a smart phone, an iPad, and a tablet.

The digital twin 114 continuously reads data from transaction systems 104. It independently interprets this data based on its defined model, independent of transaction system. The digital twin 114 in accordance with the present invention thus acts as an observer, Also, the digital twin 114 does not participate in processing of transactions which are handled within the transaction systems 104, but is capable of making predefined interventions. This 'supervisory mode' configuration enables the digital twin to monitor the process and bring in convergence without disruptions to ongoing operations and processing of transactions. This aspect brings to the present invention significant advantage over prior art.

Further, the digital twin 114 reads only selected or 'tagged' attributes of the underlying transactions and has its own independent logic of 'interpreting' these tag values. This aspect of having synchronized, live data and independent interpretation keeps the model free of unnecessary transaction complexities. The independent configuration of logic builder allows the twins to be created with any level of complexity, irrespective of underlying systems or transactions.

Figure 9:
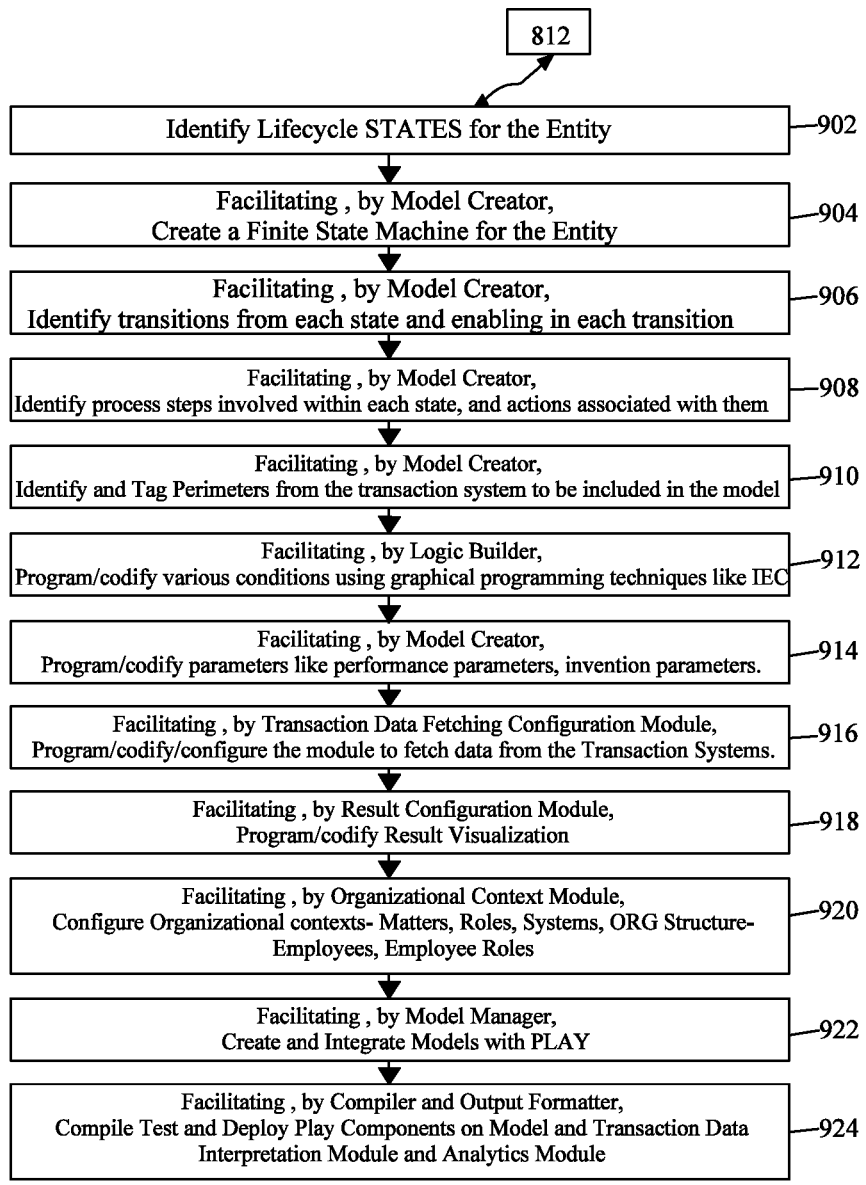
FIG. 9 shows elaborated steps, of a step for 'creating a play' in the method steps of FIG. 8.

FIGS. 8 and 9 describe steps involved in method of creating dynamic model and monitoring the process using the system 100 of the present invention. The method 800 includes steps involved in identifying and qualifying candidate entities, creation of various models for the entities as plays, deploying and running these plays as digital twins of the processes and monitoring the processes using these twins. This method is preferably executed on the system 100 of the present invention.

In a first step 802, for an organization, various process areas are identified and a specific process area is prioritized for creation of digital twins.

In step 804, all objects or entities participating in the selected process area of 802 are identified and listed. In a step 806, holonic entities from the list are identified and all non-holonic entities are merged as attributes or properties of holonic entities. In step 808, identified holonic entities are 'qualified' for creation of plays. The entities which are not qualified in this step, for which plays will not be created are merged into appropriate qualified entity as properties.

In steps 806 and 808, the method manages interrelationships between plays as holarchies. The step of merging non-holonic entities as well as holonic entities not qualified for plays, into the selected entities, ensures comprehensiveness of operational model. The holarchic structure provides complete flexibility and control over complexity of digital twin.

In a step 810, creation of plays is prioritized and ordered. In this step, play builder 112 records the result of all previous method steps. In the step 812, for each qualified entity the play 502 is created. The step 812 is executed on the model builder 112 of the system 100. The output of this step 812 is the digital twin definition 202.

In a step 814, interfaces with transaction systems are setup and configured based on the definitions of these interfaces created in the step 812 systems and tags. These interfaces with transaction systems are set up in the data fetching module 704.

In a step 816, digital twin definition 202 is executed as digital twin 114 in supervisory mode. The model is deployed in supervisory mode as digital twin 114 on the server 210. In step 818, business processes are monitored using the digital twin. In this step, the client module 212 is utilized to continuously monitor performance measurements, status and exception conditions, thus improving the performance parameters, including strategic, tactical or operational KPIs.

FIG. 9 describes steps involved in the step 812 of FIG. 8. These steps are included in the process of creating each play 502. In a step 902, the lifecycle states of the entity are identified. In a step 904, finite state machine is created for the entity using the model creator 602. In a step 906, allowable transitions and enabling conditions for each transition are identified and recorded. In step 908, activities performed in each state and manual or automated actions associated are identified. In this step, record them as 'steps' in the model creator 602. In a step 910, attributes from transaction systems 104 are identified and tagged. In this step, Tag List 538 in the model creator 602 is recorded. The steps 902 through 906 record structural, compositional as well as lifecycle information about the entity.

In a step 912, the interpretation logic required for operation of digital twins using logic builder 604 is programmed. This steps incorporates the process dynamics in the model. In an embodiment, this steps uses standards based on IEC 61131 and IEC 61499. A unique feature of this method step is that, the logic requirements are prescriptively specified by the module builder 112 from the structural and lifecycle information captured using model creator 602 in step 910. This feature greatly simplifies model creation.

In step 914, the performance parameters and interventions using model creator 602 are programmed. In step 916, based on the tag list and other data requirements, the data fetching module 606 is configured. In step 918, visualizations for the play 502 are created and configured using result configurator 608.

In a step 920, organizational context including masters, relationships, master roles etc. using organization module 610 are configured.

In a step 922, other models into the play are created and integrated using model manager 612.

In a step 924, the play 502 or digital twin definition 202 is compiled and tested using compiler and output formatter. The system deploys individual components to data fetching module 704, model interpretation module 700 and analytics module 722.

Now referring to FIGS. 1 to 9 in operation, in an organization utilizing the system and method of present invention, multiple stakeholders participate in creating and using proposed digital twins 114. Process owners are owners of process definition of a particular set of processes. Typically, they are also owners of some business function belonging to that particular area and are considered experts in that particular process. System administrators are responsible for deploying, monitoring and maintaining the digital twins 114 and various interfaces with other IT systems. Business users are end users of the system of present invention.

After a process area 314 is chosen for creation of digital twins 114, the process owner for that process area 302, along with other stakeholders, chooses and qualifies the candidate entities for creation of plays 502, according to steps 806, 808 and 810. First, all objects and entities, participating in functioning of the process area 302 are identified. These are classified into holonic or non-holonic entities in accordance with the criteria. The holonic entities 404n are further qualified according to business requirements for creation of plays 502. It is ensured that identified non-holonic entities and holonic entities 404n not qualified for play creation are merged into qualified entities as attributes.

It is understood, however, that these steps ensure that the model of the process area 302 as a set of plays is collectively exhaustive representation of the process. This also ensures that each play 502 is self-contained and independent, while maintaining close holarchical relationship with other plays, thus ensuring consistency and scalability in the overall model. On the system 100 of the present invention, the above decisions are recorded. This step starts with all process owners collaboratively configuring the organization 300, process areas 302 and defining the plays 502. Using at least one first user device 206 and organization definition module 300 process owners maintain all relevant context information as defined in organization 300. In accordance with the present invention, a play 502 comprises of at least one operational model 504 and may include a combination of other operational 540 or analytical models. Using at least one user device 206 and model builder 112 of the proposed system, process owner first creates base operational model 504 of entity. This includes defining the entity lifecycle, states and steps, performance parameters, participating systems for identified steps and performance parameters. Based on this, operational model tags are created in the tag list 538. Process owner then incorporates the non-transactional parts of the process by configuring other analytical or operational models as other models 540 into the play definition. In defining these, model creator 602, logic creator 604 and transaction data fetching configuration module 606 are used.

Process owner and business user collaboratively configure client-side visualizations for a play 502, as required by visibility requirements 510 for the play 502, by defining at least one widget using results configuration module 608. after defining all components of a play 502, process owner integrates other models with the play 502 by using model manager 612. Process owner compiles the play using compiler and output formatter module 614. The resulting output of successful compilation is the digital twin definition 202. This artifact is persisted on storage 204. In an embodiment, the model builder 112 component may be hosted on a user device 206 as a desktop or mobile application. In other embodiments, the model builder 112 components may be hosted on a cloud and accessed from the first user device 206.

The server side environment set up includes separate servers for model and data interpretation module 700, client handler 714 and analytics module 722. In an embodiment these servers may be hosted in cloud or in a dedicated data centre. The set up also includes a server data fetching module 704 and actuation module 712. In an embodiment, these include a messaging and streaming platform like apache kafka. The server side environment also includes data storages for model data and model definitions. In an embodiment, these include at least one graph database and a database supporting sql or non-sql data.

System administrator deploys the play 502 or digital twin definition 202 on the server 210. The system 100 of proposed invention has a functionality that deploys various components on respective server environments. The system administrator configures the schedulers with specific schedules for individual model evaluations as well as for system-wise data fetching. Finally, the digital twin 114 is put on 'run' mode, where it starts running in supervisory with the transaction systems 104 and auxiliary systems 108 and begins evaluating the model and begins interpreting the data.

After being put into "run", the server component 210 begins executing its actions. The transaction data fetching configuration module 606 triggers the communication with transaction systems 104 as per predefined schedules to the read the data. Received data is stored in transaction data buffer 706. The transaction data processing module 710 reads data from the buffers 706, evaluates the model and stores evaluation outcomes in database. Analytical models configured within the play 502 are evaluated by the analytics module 722 as per the model evaluation schedules 708 based on data in database.

The client handler module 714 handles requests from multiple second user devices 208. The requests generated using second client device 208 are handled by request controller 718 and response to the request is sent by result generator 720 which are displayed on the user device 208 by process viewer 730 and result formatter 732.

After play 502 is deployed and digital twin 114 starts running, business users and process owner can start monitoring business process using client module 120 installed on the at least one second client device 208. Using results from client module 120, business users and process owner can monitor the process using features like process view, lifecycle view, process health, system health, actions generated for specific entity for each user, alerts generated as per process performance requirements, timeline of each entity, various dashboards and outputs of other models integrated into the play 502. These views are rendered by results configuration module 608. User can communicate and collaborate with other users using collaboration client 740. The chat can be general chat or topic chat specific to any entity/action/alert.

The system and method of the present invention advantageously create dynamic models of processes in an organization. Further, the system and method monitor said processes by deploying the models as digital twins of the actual processes.

The present invention provides a comprehensive, end to end and flexible solution for monitoring processes in an organization. The solution is capable of modeling entire organization or can be applied to only a single entity. Boundaries and scope of a play can be chosen between any two states. Thus play boundaries can be split or combined. Plays can be implemented separately and linked through holarchies or may be merged into a single play. The system and method allow inclusion of auxiliary non-transaction activities. They also enable inclusion of interdependent systems. Thus the method and system advantageously provide a comprehensive, yet flexible solution.

The present invention where a process is monitored through a 'live digital twin' provides status views by evaluating model parameters based on real time data. This eliminates inherent complexities associated with transactions, flexibly allows the implementer to choose complexity levels of digital twins and simplifies implementation and operations. Further, while the digital twin runs in production, it does not interfere with any transaction systems.

The present invention, where digital twin is configured in supervisory mode, the twin works as a real time observer which independently evaluates its model and also provides a systemic mechanism to initiate or actuate specific predefined interventions. This configuration provides a number of advantages. The implementation of digital twins does not cause any disruption to operations.

The present invention, where organization is configured to provide a context to all plays advantageously eliminate challenges of inconsistent masters or mismatched records, thus overcoming technology silos. Further, as a result of having a common context across all the plays, most of organizational complexities are advantageously disentangled.

The present invention advantageously creates a view of the 'process' as opposed to simply an ordered collection of activities. The finite state machine provides a 'business view' whereas the steps provide and activities view which is closely linked with systems. Any converging non transaction process steps, or any new technology can thus be plugged into the model at appropriate level of steps or action or at a process state. Thus the present invention creates an advantageous way of achieving seamless convergence between new technologies and ongoing operations with less effort and without disruption to business. Further, this allows definition of performance measures to be aligned to this business view at strategic, tactical and operational levels, as well as allows proactive capturing or process alerts, which advantageously make the digital twins aligned with business objectives of the organization.

The method of the present invention includes definition of a play as a combination of models of lifecycle of a holonic entity. This is very different from the prior practice of modeling a process as an ordered collection of activities. This method step makes a big difference to the field of modeling of business processes. By defining and configuring the plays in this way, the method advantageously enables dividing the process area into mutually exclusive and collectively exhaustive entity lifecycles called 'plays' in the present invention.

The method of the present invention further defines steps to achieve optimal granularity of play definition by merging non-holonic entities or holonic entities not selected for plays into at least one of selected entities as entity attributes. This ensures that entire entity-attribute space of the process area is covered by its digital twin. This exhaustive coverage provides big advantage to the digital twins created by the present invention.

The method of the present invention allows multiple plays in same process area to share holarchical relationships. This modeling of process areas as holarchies of plays provides tremendous flexibility and scalability to the enterprise model, as the users may choose appropriate granularity of plays to be created. Further, this gives flexibility to evolve some of the holonic attributes into plays at later stages, without disrupting existing plays.

The method of present invention makes use of the finite state machine for the entity lifecycle as a medium to capture the 'process' and subsequently links these states to activities and system. This method step provides a significant advantage over the prior art as it makes system of the present invention comprehensive process model.

The system of the present invention provides a single end to end platform for modeling and monitoring of processes. The system 100 does model creation, model validation, model deployment including setting up of interfaces, execution of model as digital twin and monitoring of the process.

The system of the present invention allows multiple auxiliary models to be integrated in a single play, enable non-transactional portions of the process to be easily brought into a single model. This results in tremendous advantages.

The system of present invention, where a single lifecycle model transcends multiple transactions, across many systems, advantageously provides unified, end to end models, providing end-to end views of process with complete ease. Further, as this end-to-end view is available for entire process, and for all entities, this system advantageously democratizes the visibility of the process.

The system of present invention allows 'codeless', graphical programming, allow business users to create/maintain process logic for the twin themselves. Thus, this system and hence the twin can be advantageously accessible as well as responsive to changing business needs. Further, the system prescriptively specifies requirements for logic. This makes the complete implementation very easy and robust. Further, since this logic is independent of transaction logic, is free from transaction related complexities and is created by business users, this logic can easily incorporate process nuances and customizations. Therefore, this system very effectively breaks organizational barriers.

The system of present invention, allows each activity or step to be mapped to states on one side and systems on other side, advantageously provides a combined process-system health view that provides insights on real time health of all systems and its impact on overall process state. This is extremely useful to reduce effort and cost of IT application management.

The system of present invention enables real time collaboration through secure messaging built within the system. Specifically, using the topic chat functionality of the system, users can collaborate and communicate with context rich and effective features on business relevant topics such as a specific entity, an alert condition or a specific KPI trend etc.

The system and method advantageously enables configuration, deployment and running of digital twins of business processes in a short time and with less effort.

The foregoing description of the embodiments has been provided for purposes of illustration and not intended to limit the scope of the present invention. Individual components of a particular embodiment are generally not limited to that particular embodiment, but, are interchangeable. Such variations are not to be regarded as a departure from the present invention, and all such modifications are considered to be within the scope of the present invention.

The embodiments were chosen and described in order to best explain the principles of the present invention and its practical application, to thereby enable others, skilled in the art to best utilize the present invention and various embodiments with various modifications as are suited to the particular use contemplated.

It is understood that various omission and substitutions of equivalents are contemplated as circumstance may suggest or render expedient, but such are intended to cover the application or implementation without departing from the scope of the present invention.

The invention claimed is:

1. A system (100) for modeling and monitoring processes in organizations, using digital twins comprising:
    a first user device (206), the first user (206) device being configured to receive data from the user;
    a model builder (112) for creating models, the model builder (112) communicating with a first user device (206) and creating an integrated model of a process, called digital twin definition (202);
    a digital twin (114) running the model in digital twin definition (202), the digital twin (114) having a server component (210), the server component (210) executing the digital twin definition (202) and further communicating with multiple transaction systems (104) and auxiliary systems (108), the server component (210) interpreting models and executing a PLAY (502);
    the digital twin (114) having a client module (212), the client module (212) enabling output on a second user device (208); and
    deploying such digital twins and monitoring the processes using such digital twins, wherein the digital twin (114) communicates with a plurality of transaction systems (104) and auxiliary systems (108) in a bidirectional manner, a data exchange includes reading data related to transactional and organizational information and writing data through systemic mechanisms to initiate or actuate specific predefined interventions.

2. A system (100) for modeling and monitoring processes in organizations, using digital twins as claimed in claim 1, wherein the model builder (112) processes user inputs to create, validate and compile the digital twin definition (202) and stores the digital twin definition (202) on a storage unit (204).

3. A system (100) for modeling and monitoring processes in organizations, using digital twins as claimed in claim 1, wherein the digital twin definition (202) includes at least one operational model (504) and a plurality of other models (540) of an entity being modeled, representing transactional and non-transactional aspects of the process, and the operational model (504) includes definition of entity lifecycle (506), process performance parameters (508), visibility requirements (510) and actuation requirements (512).

4. A system (100) for modeling and monitoring processes in organizations, using digital twins as claimed in claim 1, wherein the digital twin definition (202) includes organizational information related to masters, IT and non-IT systems, organizational structures, roles and responsibilities and employee information, which provides an execution context for the model in the digital twin (114).

5. A system (100) for modeling and monitoring processes in organizations, using digital twins as claimed in claim 1, wherein the model builder (112) includes:
    a model creator (602) configured to allow a user to define finite state machine for the entity lifecycle (506), define steps within each state of the state machine and associate systems with said steps and define transition conditions between states;
    a logic builder (604) configured to allow the user to create executable logic that executes on the server component (210) of the system (100) and interprets state and dynamics of the process from input data received from the transaction systems (104), the logic builder (604) prescriptively defining requirements for model logic based on inputs to the model creator (602);
    a data fetching configuration module (606) configured to prompt user comprehensive data requirements based on lifecycle model and tag list (538) and to allow the user to configure individual data exchanges with various systems, the data fetching configuration module (606) prescriptively generating interface requirements based on inputs to model creator (602);
    a result configuration module (608) configured to enable said user to configure at least one widget for displaying client side visualizations;
    an organization definition module (610) enabling the user to capture essential information of an organization and process area;
    a model manager (612) being configured to allow said user to add other models (540) and analytical models to the play (502) and configure said models to work with the base operations model (504); and
    a compiler and output formatter (614) configured to validate received user inputs obtained from the model creator (602), the logic builder (604), the data fetching configuration module (606), the result configuration module (608) and the model manager (612), the compiler and output formatter (614) being configured to further interpret the user inputs, validate such user inputs for correctness in relation with organization information and create the digital twin definition (202) and store the digital twin definition (202) on the first data storage.

6. A system (100) for modeling and monitoring processes in organizations, using digital twins as claimed in claim 1, wherein the digital twin (114) includes:
- the server component (210) having a model and transaction interpretation module (700) configured to read transaction data and other relevant data from a transaction buffer (706) that is fetched and stored in the transaction data buffer (706) by the data fetching configuration module (606) as per the configuration specified in the digital twin definition (202), evaluate the model based on the transaction and other relevant data and send evaluation outcomes to a storage in a client handler module (714);
- the server component (210) also containing two independent scheduling modules to specify several schedules for data fetching and model evaluation frequencies;
- the client handler module (714) configured to process data from a second data storage to generate response output on receiving a request by a request controller, and further configured to interface with a result generator to format and transmit said result;
- an analytics module (722) being configured to analyze analytical models within the play (502); and
- the server (210) being configured to receive and execute digital twin definition (202); wherein the model and transaction interpretation module (700), the client handler module (714) the analytics module (722) are implemented using one or more processor(s).

* * * * *